United States Patent
Tomaru

(10) Patent No.: US 11,466,645 B2
(45) Date of Patent: Oct. 11, 2022

(54) ROCKET-ENGINE TURBOPUMP

(71) Applicant: IHI Corporation, Koto-ku (JP)

(72) Inventor: Hiroshi Tomaru, Tokyo (JP)

(73) Assignee: IHI Corporation, Koto-ku (JP)

( * ) Notice: Subject to any disclaimer, the term of this patent is extended or adjusted under 35 U.S.C. 154(b) by 353 days.

(21) Appl. No.: 16/854,962

(22) Filed: Apr. 22, 2020

(65) Prior Publication Data

US 2020/0248650 A1 Aug. 6, 2020

Related U.S. Application Data

(63) Continuation of application No. PCT/JP2018/034838, filed on Sep. 20, 2018.

(30) Foreign Application Priority Data

Feb. 27, 2018 (JP) .............................. JP2018-032749

(51) Int. Cl.
F02K 9/48 (2006.01)
F04D 13/04 (2006.01)
F01D 1/20 (2006.01)

(52) U.S. Cl.
CPC .................. *F02K 9/48* (2013.01); *F01D 1/20* (2013.01); *F04D 13/04* (2013.01)

(58) Field of Classification Search
CPC . F04D 13/04; F01D 9/02; F01D 9/047; F01D 15/08; F02K 9/48
See application file for complete search history.

(56) References Cited

U.S. PATENT DOCUMENTS

| | | | |
|---|---|---|---|
| 1,883,668 A | 10/1932 | Beckeman | |
| 2,578,443 A | 12/1951 | Nardone | |
| 3,216,191 A | 11/1965 | Madison et al. | |
| 3,232,048 A * | 2/1966 | Stockel | F02K 9/64 60/267 |
| 3,286,473 A * | 11/1966 | Cowell | F02K 9/48 60/770 |

(Continued)

FOREIGN PATENT DOCUMENTS

| | | |
|---|---|---|
| GB | 1 020 995 A | 2/1966 |
| JP | 52-118105 A | 10/1977 |

(Continued)

OTHER PUBLICATIONS

International Search Report dated Oct. 30, 2018 in PCT/JP2018/034838 filed on Sep. 20, 2018, 2 pages (Continued)

*Primary Examiner* — Topaz L. Elliott
*Assistant Examiner* — Jackson N Gillenwaters
(74) *Attorney, Agent, or Firm* — Oblon, McClelland, Maier & Neustadt, L.L.P.

(57) ABSTRACT

A turbopump includes: a main shaft rotatably supported; a pump section including an impeller attached to one end of the main shaft; and a turbine section including: a disk attached to the other end of the main shaft, rotor blades provided on an outer periphery of the disk, and nozzles provided inclined to an entrance plane of a blade cascade constituted of the rotor blades, the nozzles having axisymmetric cross sections and arranged in at least two rows along a circumferential direction of the main shaft in a plane orthogonal to the main shaft.

16 Claims, 5 Drawing Sheets

(56) References Cited

U.S. PATENT DOCUMENTS

| | | | | |
|---|---|---|---|---|
| 3,968,935 A | * | 7/1976 | Sohre | F01D 9/02 |
| | | | | 415/181 |
| 4,036,020 A | | 7/1977 | Bagley | |
| 5,403,165 A | * | 4/1995 | Lehe | F04D 13/04 |
| | | | | 417/406 |
| 5,676,522 A | | 10/1997 | Pommel et al. | |
| 6,969,028 B2 | | 11/2005 | Dun | |
| 2015/0086346 A1 | * | 3/2015 | Mueller | F01D 1/026 |
| | | | | 415/202 |
| 2015/0354593 A1 | | 12/2015 | Hiraki et al. | |
| 2016/0177963 A1 | | 6/2016 | Danguy et al. | |

FOREIGN PATENT DOCUMENTS

| | | |
|---|---|---|
| JP | 53-049607 A | 5/1978 |
| JP | 54-022003 A | 2/1979 |
| JP | 60-167102 U | 11/1985 |
| JP | 08-232603 A | 9/1996 |
| JP | 2007-023894 A | 2/2007 |
| JP | 2013-015034 A | 1/2013 |
| JP | 2014-156851 A | 8/2014 |
| JP | 2016-142209 A | 8/2016 |

OTHER PUBLICATIONS

Extended European Search Report dated Oct. 25, 2021 in European Patent Application No. 18907686.2, 7 pages.
Aghaei-Togh, R., et al., "Effects of nozzle arrangement angle on the performance of partially admitted turbines", Journal of Mechanical Science and Technology, vol. 32, No. 1, Jan. 23, 2018, XP036412648, pp. 455-464.

* cited by examiner

ROCKET-ENGINE TURBOPUMP

CROSS REFERENCE TO RELATED APPLICATIONS

This application is a continuation application of International Application No. PCT/JP2018/034838, now WO2019/167319, filed on Sep. 20, 2018, which claims priority to Japanese Patent Application No. 2018-032749, filed on Feb. 27, 2018, the entire contents of which are incorporated by reference herein.

BACKGROUND

1. Technical Field

The present disclosure relates to a rocket-engine turbopump.

2. Description Of The Related Art

In typical liquid-propellant rockets, liquid hydrogen or kerosene is used as fuel (reducing agent), and liquid oxygen is used as an oxidizing agent. These propellants are supplied from storage tanks to a propulsion system, and are burnt in the combustion chamber. To obtain a large thrust by the combustion of the propellant, it is necessary to supply a large amount of the propellant to the combustion chamber in a short time.

A turbopump is a turbo machinery capable of pumping a large amount of propellant. The turbopump includes a pump section and a turbine section. The pump section pumps a propellant from a tank to a propulsion system. The turbine section drives the pump section by using working fluid such as vaporized propellant or combustion gas of the propellant. The pump section has an impeller to suck and pump the propellant. The impeller is connected to a main shaft rotatably supported. The turbine section has a disk (turbine disk), rotor blades (turbine blades), and nozzles (turbine nozzles). The disk is supported by the main shaft. The rotor blades are provided on the outer periphery of the disk. The nozzles eject the working fluid to the rotor blades (See Japanese Patent Laid-Open Publication No. 2014-156851).

SUMMARY

A De Laval nozzle is often adopted as a turbine nozzle by which the exhaust velocity reaches a supersonic speed. The De Laval nozzle has a throat having an axisymmetric cross section. Therefore, the De Laval nozzle is easy to design and manufacture, and is often arranged inclined to a cascade of rotor blades (i.e. a blade cascade) in accordance with the inflow angle of the working fluid. In this case, a shape of the nozzle jet impinging on the rotor blade becomes elliptical in an entrance plane of the blade cascade. Accordingly, a portion in the entrance plane of the blade cascade on which the jet of the working fluid does not impinge is likely to be larger in comparison with the nozzle (airfoil nozzle) constituted by vanes (airfoil) radially arranged. Therefore, there is a concern that the loss increases in comparison with the airfoil nozzle. Further, since a throat area per nozzle is large, the nozzle tends to be long.

The present disclosure has been made in view of the above-described problems, and an object of the present disclosure is to provide a rocket-engine turbopump capable of obtaining sufficient turbine efficiency and being miniaturized.

An aspect of the present disclosure is a rocket-engine turbopump including: a main shaft rotatably supported; a pump section including an impeller attached to one end of the main shaft; and a turbine section including: a disk attached to the other end of the main shaft, rotor blades provided on an outer periphery of the disk; and nozzles provided inclined to an entrance plane of a blade cascade constituted of the rotor blades, the nozzles having axisymmetric cross sections and arranged in at least two rows along a circumferential direction of the main shaft in a plane orthogonal to the main shaft.

The nozzles may be arranged so that projected areas of outlets of the nozzles to the entrance plane along a central axes of the nozzles are positioned within the entrance plane.

Outlets of the nozzles in one of the two rows and outlets of the nozzles in the other of the two rows may be positioned in different phases around the main shaft.

Outlets of the nozzles in one of the two rows and outlets of the nozzles in the other of the two rows may have mutually different cross-sectional areas.

When the nozzle in one row of the two rows is referred to as a first nozzle, the nozzle in the other row of the two rows is referred to as a second nozzle, an ellipse of the outlet of the first nozzle projected on the entrance plane along the central axis of the first nozzle is referred to as the first ellipse, and an ellipse of the outlet of the second nozzle projected on the entrance plane along the central axis of the second nozzle is referred to as the second ellipse, a major axis of the first ellipse and a major axis of the second ellipse may be inclined in mutually opposite directions or in the same direction in the entrance plane.

Each of the nozzles may be a De Laval nozzle.

According to the present disclosure, it is possible to provide a rocket-engine turbopump capable of obtaining sufficient turbine efficiency and being miniaturized.

DESCRIPTION OF THE EMBODIMENTS

Hereinafter, an embodiment of the present disclosure will be described with reference to the drawings. Incidentally, in the respective drawings, the same numerals are assigned to common parts and duplicated description is omitted.

A turbopump 1 according to the present embodiment is installed in a rocket engine. The turbopump 1 is configured to pump fluid such as liquid hydrogen and liquid oxygen. For convenience of explanation, a side where a suction port 5a of the turbopump 1 is located is defined as the front side, and a side where an exhaust port 5b is located is defined as the rear side.

Figure 1:
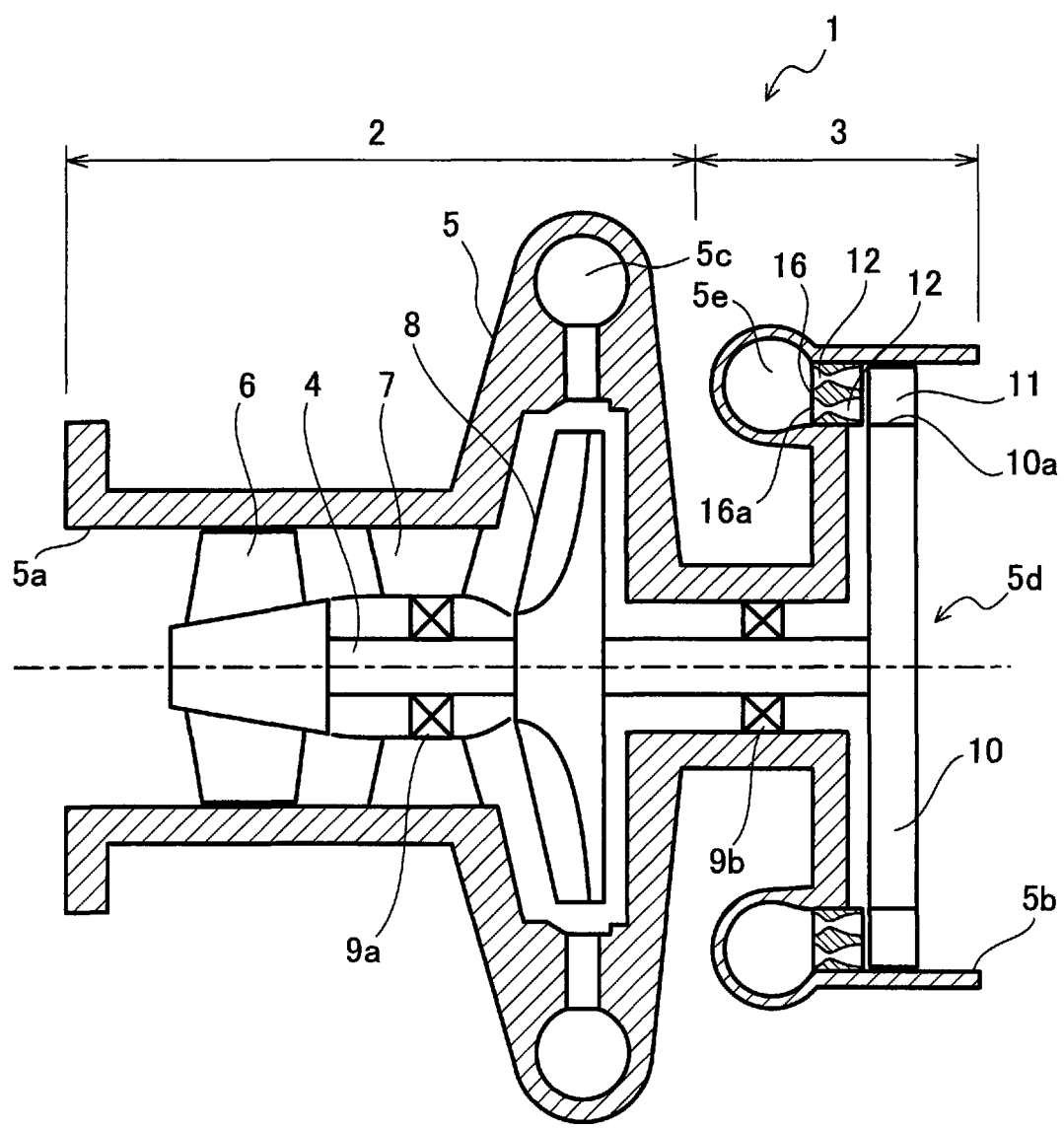
FIG. 1 is a sectional view illustrating a configuration of a turbopump according to a present embodiment.

As shown in FIG. 1, the turbopump 1 includes a pump section 2, a turbine section 3, and a main shaft (i.e. shaft, or rotary shaft) 4. These are accommodated in a casing 5.

The pump section 2 includes an inducer 6, a stator vane 7, and an impeller (wheel) 8. The inducer 6 and the impeller 8 of the pump section 2 are attached to one end (a front end) of the main shaft 4.

The inducer 6 is located on the downstream side of the suction port 5a formed in the casing 5. The inducer 6 has a hub connected to the main shaft 4 and blades extending in the radial direction from the hub. The inducer 6 sucks fluid from the suction port 5a by its own rotation, and pressurizes and discharges the fluid. With such operation, the inducer 6 assists a suction of the fluid by the impeller 8.

A stator vane 7 is positioned on the downstream side of the inducer 6. A tip side of the stator vane 7 is fixed to the casing 5. The stator vane 7 regulates the flow of the fluid flowing out from the inducer 6, and guides the fluid to the impeller 8. As described above, a bearing 9a is provided on the hub side of the stator vane 7.

The impeller 8 is positioned on the downstream side of the stator vane 7. The impeller 8 includes blades. With the rotation of the blades, the fluid flowing into the impeller 8 is pressurized and flows out radially outward. That is, the impeller 8 pumps fluid by its own rotation. The fluid flowing out from the impeller 8 is supplied to a combustion chamber (not shown) or the like of the rocket engine through a scroll 5c formed at a position radially outward of the impeller 8.

The main shaft 4 is rotatably supported in the casing 5 by a bearing 9a provided on the tip side of the stator vane 7 and a bearing 9b provided between the impeller 8 and the disk 10 (described later) of the turbine section 3. Accordingly, the inducer 6 and the impeller 8 of the pump section 2 and the disk (rotor blade 11) of the turbine section 3 integrally rotate around the main shaft 4 as the rotation center.

The turbine section 3 generates rotational force of the impeller 8 by utilizing the kinetic energy of the vaporized propellant. The turbine section 3 includes a disk (i.e. rotor, or turbine disk) 10, rotor blades (turbine blade) 11, and turbine nozzles (hereinafter, referred to as nozzles) 12. As described above, the turbopump 1 according to the present embodiment is intended to be installed in a rocket engine. Therefore, the size of the turbopump 1 is significantly limited. Under such circumstances, the turbine section 3 according to the present embodiment is designed to operate as an impulse turbine capable of obtaining high output with a small number of stages.

The disk 10 is accommodated in a turbine chamber 5d formed in a casing 5. The disk 10 is a member formed into a disk shape. The disk 10 is attached to the other end (rear end) of the main shaft 4. That is, the disk 10 is connected to the inducer 6 and the impeller 8 of the pump section 2 via the main shaft 4.

The rotor blades 11 are provided on an outer periphery (peripheral surface) 10a of the disk 10. A span of each rotor blade 11 extends in the radial direction 4r of the main shaft 4 (see FIG. 3), and a chord of each rotor blade 11 extends in the axial direction of the main shaft 4. The rotor blades 11 are arranged at equal intervals in the circumferential direction of the main shaft 4, and constitute a blade cascade of one stage. The number of stages of the turbine may be two or more.

The rotor blade 11 includes: a leading edge 11a, a trailing edge 11b, a suction side 11c, and a pressure side 11d. The leading edge 11a faces an outlet 13 of the nozzle 12. The trailing edge 11b faces the exhaust port 5b. The suction side 11c faces in the rotational direction R of the disk 10 and connects between the leading edge 11a and the trailing edge 11b. The pressure side 11d faces in a direction opposite to the rotational direction R, and connects between the leading edge 11a and the trailing edge 11b.

Gas ejected from the nozzle 12 impinges on the pressure side 11d of each rotor blade 11. The gas is a propellant which is vaporized by heat exchange with the combustion chamber (not shown) of a rocket engine. Hereinafter, the vaporized propellant is referred to as "propellant gas" for convenience of explanation.

The leading edges 11a of the rotor blades 11 constitute an entrance plane 15 for the propellant gas. The entrance plane 15 is annularly distributed around the center P of the disk 10. The entrance plane 15 has a width $15w$ substantially same as the span length of the rotor blade 11. The entrance plane 15 is orthogonal to the main shaft 4, for example.

Figure 3:
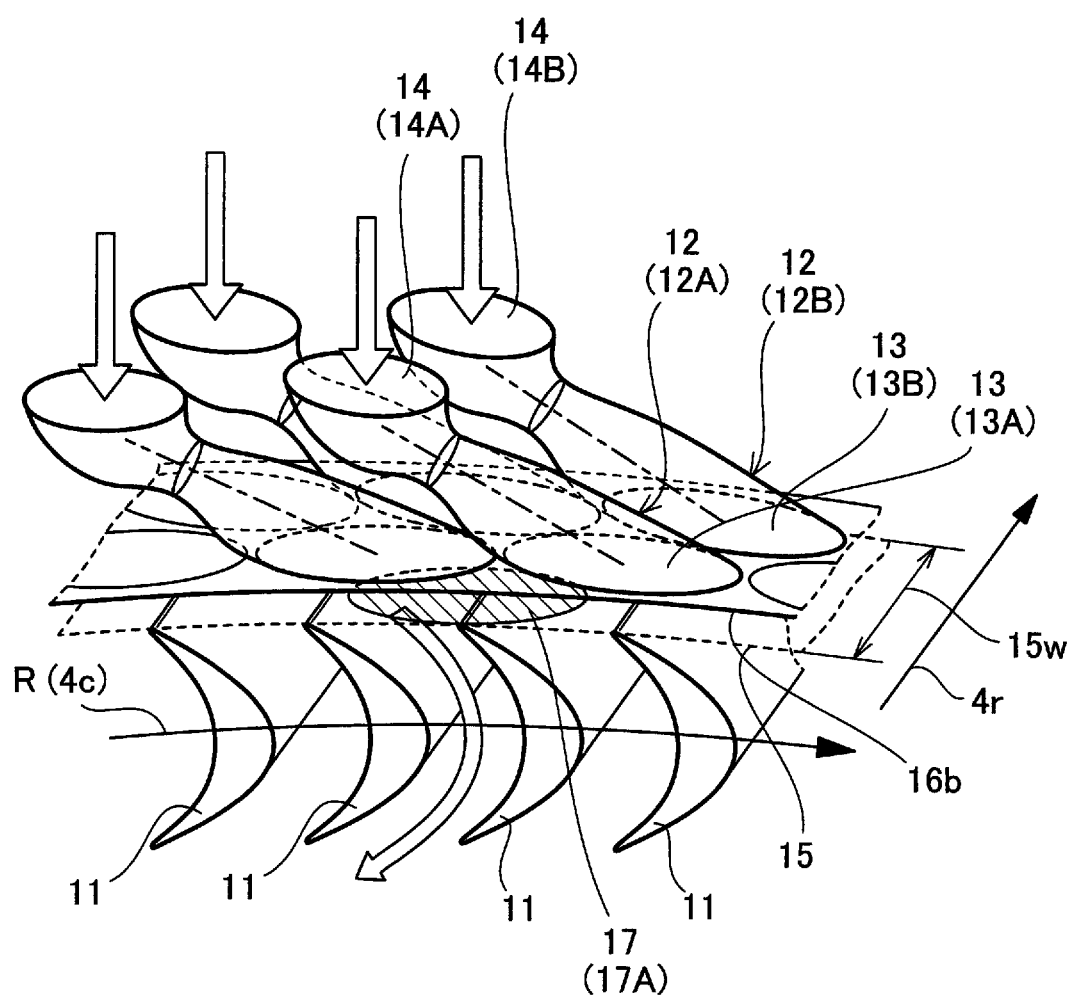
FIG. 3 is a perspective view illustrating the nozzle and the rotor blade according to the present embodiment.

The propellant gas ejected from the nozzle 12 passes through the entrance plane 15, and thereafter impinges on the pressure side 11d of the rotor blade 11. The propellant gas is deflected along the airfoil of the rotor blade 11 and discharged from the blade cascade of the rotor blades 11 while losing kinetic energy of the gas by the impingement on the rotor blade 11. In FIG. 3, the flow of the propellant gas is indicated by hollow arrows. The propellant gas passing through the blade cascade flows out from the exhaust port 5b of the casing 5.

On the other hand, the disk 10 receives the lost kinetic energy of the propellant gas via the rotor blade 11 and rotates in the circumferential direction of the main shaft 4 together with the main shaft 4. The driving force (so-called rotational force) accompanying the rotation is transmitted to the inducer 6 and the impeller 8 via the main shaft 4, thereby the inducer 6 and the impeller 8 are rotated.

When the inducer 6 and the impeller 8 rotate, the liquid propellant is supplied from the storage tank (not shown) to the suction port 5a. Thereafter, the propellant is pressurized by the rotation of the inducer 6, further pressurized by the rotation of the impeller 8, and discharged to the combustion chamber (not shown) or the like through the scroll 5c. That is, pumping of the propellant is performed.

The nozzle 12 according to the present embodiment will be described. The nozzle 12 according to the present embodiment is formed in a nozzle ring 16 (See FIGS. 1 and 4B) centered on the main shaft 4. The nozzle ring 16 is an annular member having a predetermined thickness along the main shaft 4. The nozzle ring 16 is fixed in the casing 5 to partition between the turbine chamber 5d and the admission passage 5e. The nozzle ring 16 includes a front surface 16a (see FIG. 1) facing the admission passage 5e and a back surface 16b facing the entrance plane 15 of the blade cascade. The inlet 14 of the nozzle 12 opens on the front surface 16a of the nozzle ring 16, and the outlet 13 of the nozzle 12 opens on the back surface 16b. The back surface 16b of the nozzle ring 16 is orthogonal to the main shaft 4. Here, the back surface 16b is an example of a "plane perpendicular to the main shaft 4" as described later.

The nozzle 12 is a cylindrical flow passage having an axisymmetric cross section. The nozzle 12 accelerates the propellant gas supplied from the admission passage 5e and ejects the propellant gas toward the rotor blade 11. In other words, the nozzle 12 is formed in a cylindrical shape extending along the central axis 12c, and an inner peripheral surface of the nozzle 12 forms an axisymmetric cross section orthogonal to the central axis 12c. That is, the inner peripheral surface of the nozzle 12 does not have a discontinuous surface (line). Since the nozzle 12 has the axisymmetric cross section, the nozzle is easily machined. For example, machining such as cutting or the like may be employed to form the nozzle 12. Further, as described below, the nozzle 12 according to the present embodiment has such a high performance as to be a substitute for an airfoil nozzle which has a complicated shape leading a difficulty for designing and manufacturing. Therefore, the nozzle 12 can reduce costs and improve reliability.

The nozzle 12 is a so-called De Laval nozzle. The nozzle 12 includes a throat 12t which is a portion where a flow passage of the propellant gas is narrowed (choked) to accelerate the propellant gas. The propellant gas is compressed and accelerated while flowing from the inlet 14 to the throat 12t, and the speed reaches the speed of sound at the throat 12t. Thereafter, the propellant gas is further accelerated toward the outlet 13 while being expanded. The De Laval nozzle is suitable for the nozzle of an impulse turbine, because it can generate supersonic gas with a simple structure. However, the nozzle 12 may be formed in a tapered cylindrical shape having a minimum cross-sectional area at the outlet 13.

Figure 2:
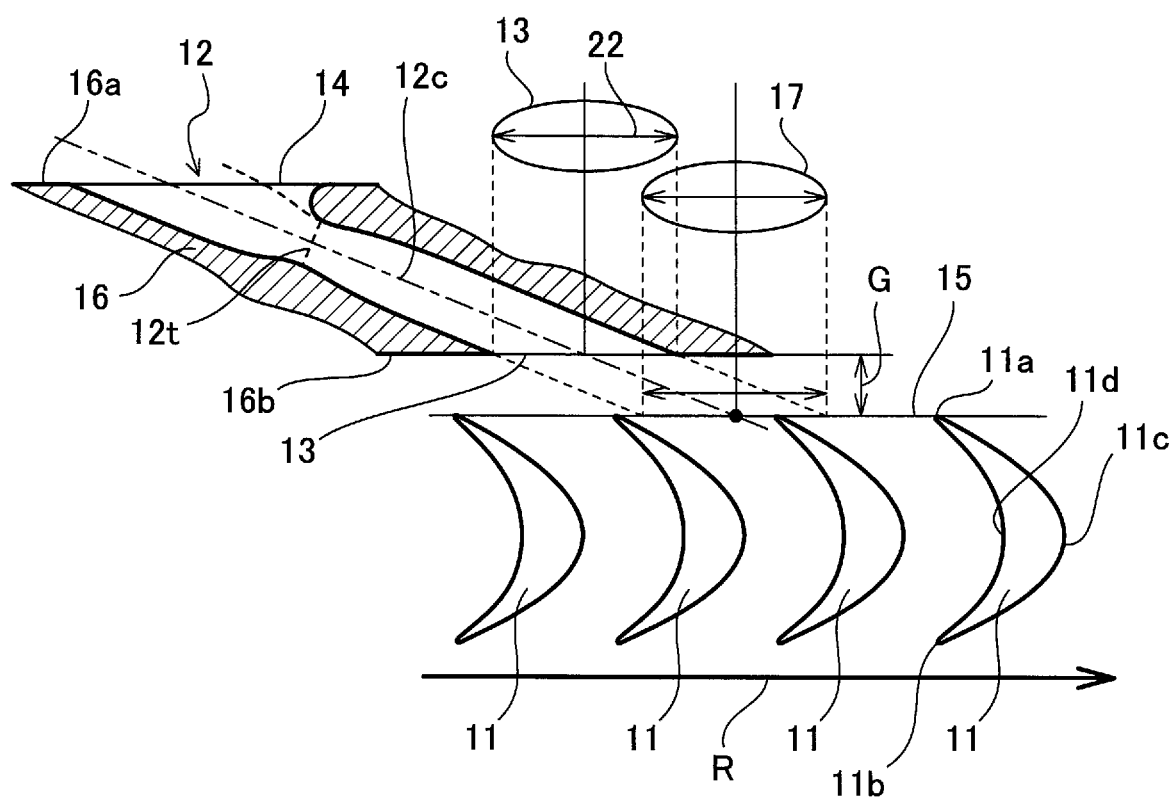
FIG. 2 is a sectional view illustrating a nozzle and a rotor blade according to the present embodiment.

As shown in FIGS. 2 and 3, the nozzle 12 is provided inclined to the entrance plane 15 of the blade cascade constituted of the rotor blades 11. Accordingly, the inlet 14 and the outlet 13 of the nozzle 12 are inclined with respect to the central axis 12c. For example, the outlet 13 of the nozzle 12 is formed in an ellipse, and a major axis 22 of the ellipse is located on the plane including the central axis 12c. The outlet 13 of the nozzle 12 is separated away from the entrance plane 15 by a predetermined distance G. Accordingly, the ejection area 17 of the propellant gas at the entrance plane 15 is located on an extension line of the central axis of the nozzle 12, and has the substantially same shape as the outlet 13 of the nozzle 12. The outlet 13 of the nozzle 12 and the ejection area 17 of the propellant gas are displaced from each other along the rotational direction R of the rotor blade 11.

The position and shape of the inlet 14 of the nozzle 12 can be arbitrarily designed as long as the flow rate and flow velocity of the propellant gas at the outlet 13 meet desired conditions. For example, as shown in FIG. 2, the inlet 14 side of the nozzle 12 may have a portion that bends outward with respect to the central axis 12c from the throat 12t having the smallest cross-sectional area toward the inlet 14.

Figure 4A:
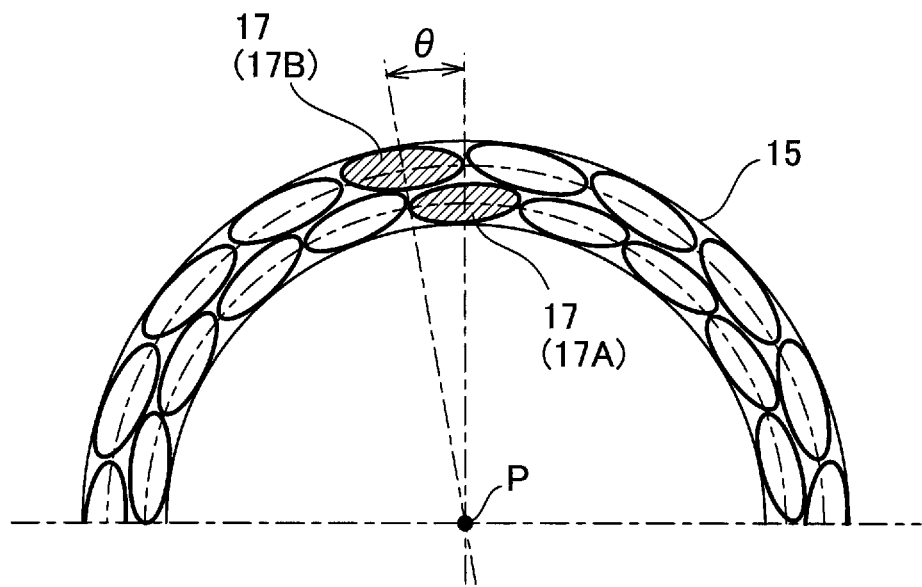
FIG. 4A is a diagram for describing a positional relationship between an ejection area by the nozzle and an outlet of the nozzle on an entrance plane of a blade cascade, and is the diagram illustrating an example of the nozzle ejection area on the entrance plane of the blade cascade.
Figure 4B:
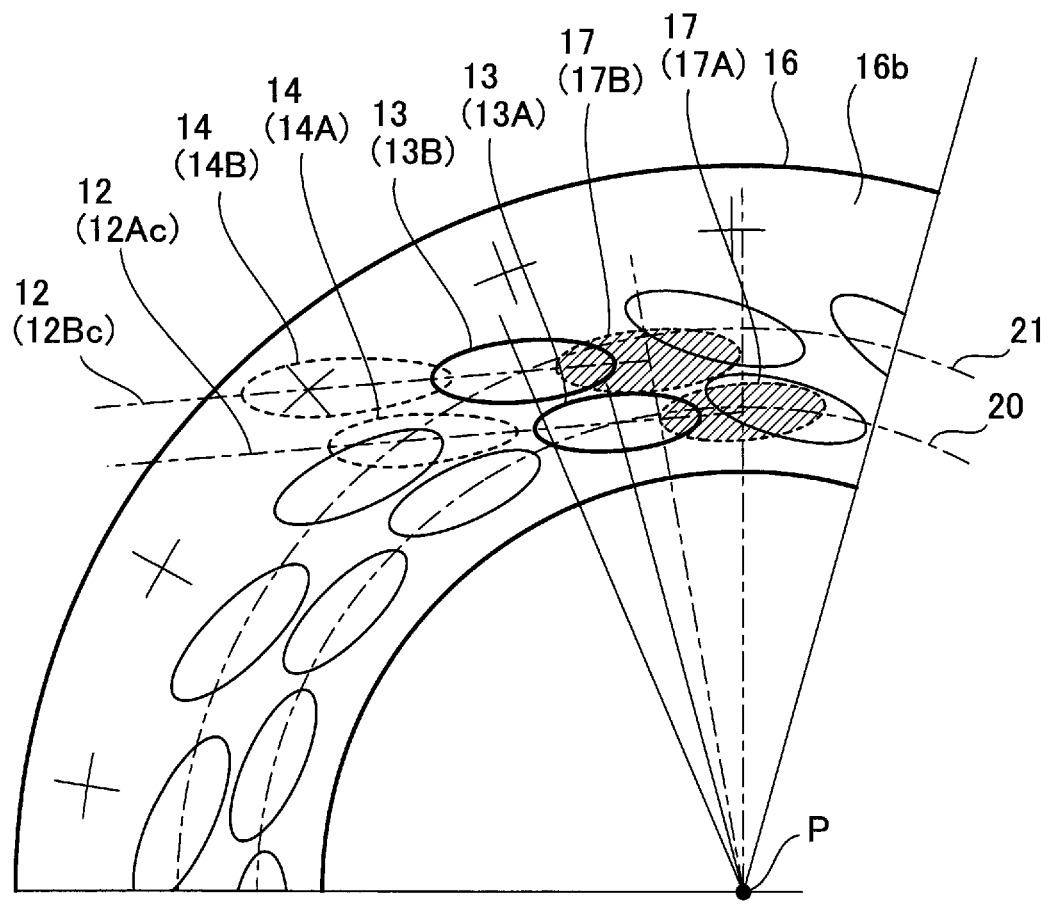
FIG. 4B is a diagram for describing the positional relationship, and is a rear view of the nozzle ring illustrating the outlet of the nozzle corresponding to the ejection area as shown in FIG. 4A.

As shown in FIGS. 3 and 4B, the nozzles 12 are arranged in at least two rows along the circumferential direction 4c of the main shaft 4 in a plane orthogonal to the main shaft 4. Hereinafter, the description will be made focusing on two rows of the at least two rows (for example, adjacent two rows). One of the two rows is referred to as a first row, and the other of the two rows is referred to as a second row. The second row is positioned radially outward of the first row with respect to the main shaft 4.

The overall dimensions of the nozzle increases or decreases according to the flow rate of the propellant gas to be circulated. Therefore, by arranging the nozzles 12 in plural rows, the overall dimensions of each nozzle 12 can be made smaller than that of a nozzle arranged in one row (i.e. single row), while securing the same flow rate and flow velocity as those of the nozzles arranged in one row. That is, it is possible to obtain the required turbine efficiency and reduce the thickness of the nozzle ring 16, and the overall size and weight of the turbopump 1. Further, the stress applied to the rotor blade 11 can be dispersed in the span direction of the rotor blade 11 as compared with the nozzles arranged in one row. In other words, the stress is continuously distributed. Therefore, it is possible to suppress or avoid the destruction of the rotor blade 11 due to the excitation of vibrations in the rotor blade 11.

For convenience of explanation, the nozzles forming the 1st row among the plural nozzles 12 are referred to as the 1st nozzles 12A, and the nozzles forming the 2nd row are referred to as the 2nd nozzles 12B. The outlet, inlet, and central axis of the 1st nozzle 12A are represented by 13A, 14A, and 12Ac, respectively. The outlet, inlet, and central axis of the 2nd nozzle 12B are represented by 13B, 14B, and 12Bc, respectively. Further, in the entrance plane 15, the ejection areas 17 corresponding to the outlets 13A are represented by the ejection areas 17A. Similarly, in the entrance plane 15, the ejection areas 17 corresponding to the outlets 13B are represented by the ejection areas 17B.

As shown in FIG. 4B, the 1st nozzles 12A are arranged along a 1st circle 20 centered on the main shaft 4, for example, in a plane orthogonal to the main shaft 4. Therefore, the center of the outlet 13A of the 1st nozzle 12A is located on the 1st circle 20. Similarly, the 2nd nozzle 12B is arranged along a 2nd circle 21 which is concentric with the 1st circle 20 and has a radius larger than that of the 1st circle 20. Therefore, the center of the outlet 13B of the 2nd nozzle 12B is located on the 2nd circle 21.

As shown in FIG. 2, the ejection area 17 of the nozzle 12 in the entrance plane 15 of the blade cascade can be represented as a projection (projected area) of the outlet 13 of the nozzle 12 to the entrance plane 15 along the central axis 12c of the nozzle 12. As shown in FIG. 4A, the ejection areas 17 of the nozzles 12 are arranged so that they are positioned within the entrance plane 15. The array of outlets 13 shown in FIG. 4B is formed to satisfy (form) the array of ejection areas 17 as shown in FIG. 4A.

As shown in FIG. 4B, the outlets 13 of the nozzles 12 in one of the two rows and the outlets 13 of the nozzles 12 in the other of the two rows may be positioned in different phases (angles) around the main shaft 4. In other words, the outlets 13A of the 1st nozzles 12A and the outlets 13B of the 2nd nozzles 12B may be alternately positioned (i.e. may be staggered) in the circumferential direction of the main shaft 4. In this case, an area occupied by the ejection areas 17 in the entrance plane 15 can be increased as compared with nozzles arranged in one row. Further, it is possible to obtain substantially same occupied area as that by airfoil nozzles and reduce the fluid dynamical loss at the entrance plane 15.

The phase shift between the outlet 13A of the 1st nozzle 12A and the outlet 13B of the 2nd nozzle 12B is set so that, for example, the phase shift between respective ejection areas 17 in the entrance plane 15 is within a range of an angle θ from ¼ to ¾ of the circumferential angle defined (subtended) by each ejection area 17 with respect to (from) the center of the main shaft 4.

The outlets 13 of the nozzles 12 in one of the two rows and outlets 13 of the nozzles 12 in the other of the two rows may have mutually different cross-sectional areas. In other words, the outlets 13A of the first nozzle 12A and the outlets 13B of the second nozzle 12B may have cross-sectional areas with mutually different values. For example, the outlet 13B of the 2nd nozzle 12B may have a cross-sectional area larger than that of the outlet 13A of the 1st nozzle 12A, and vice versa. As recognized from FIG. 4A, a circumferential length of the 2nd circle 21 is longer than that of the 1st circle 20. Therefore, by changing the dimensions and the number of the first nozzles 12A and the second nozzles 12B, an area in the entrance plane 15 not occupied by the ejection areas 17 can be reduced as compared with the case where the nozzles having the same dimensions are arranged in two rows. That is, it is possible to further increase an area occupied by the ejection areas 17 in the entrance plane 15.

Figure 5:
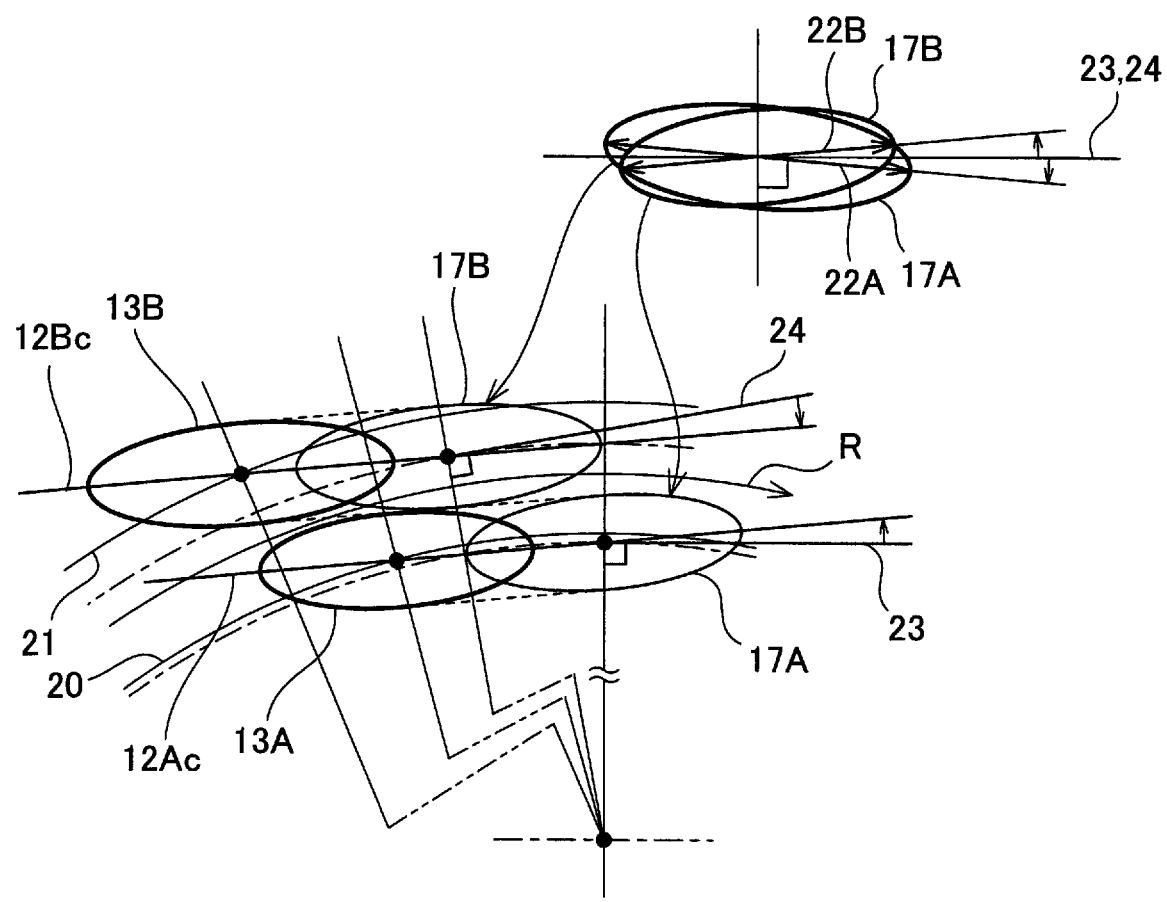
FIG. 5 is a diagram for describing a slope of the outlet of the nozzle in each row.

As described above, the ejection area 17 of each nozzle 12 in the entrance plane 15 is elliptical. As shown in FIG. 5, the ejection area (first ellipse) 17A of the first nozzle 12A has a major axis 22A. Similarly, the ejection area (second ellipse) 17B of the 2nd nozzle 12B has a major axis 22B. Here, the major axis 22A and the major axis 22B may be inclined in mutually opposite directions with respect to tangents of the circles 20 and 21 at the centers of the respective ejection areas 17A and 17B in the entrance plane 15.

In other words, the central axis 12A$c$ of the first nozzle 12A and the central axis 12B$c$ of the second nozzle 12B, which are projected to the back surface 16$b$ of the nozzle ring 16, extend parallel to each other or extend approaching each other toward the rotation direction R.

When a size of the cross section of each nozzle 12 and a distance between the entrance plane 15 and the outlet 13 of each nozzle 12 are sufficiently small, the major axis 22A of the ejection area (first ellipse) 17A and the major axis 22B of the ejection area (second ellipse) 17B may be parallel to each other. However, as the size of each nozzle 12 increases, adjacent nozzles 12 tend to interfere with each other. Therefore, the central axes 12A$c$ and 12B$c$ of the nozzles are inclined so that the major axis 22A of the ejection area 17A and the major axis 22B of the ejection area 17B are inclined in mutually opposite directions or in the same direction with respect to the respective tangent lines 23 and 24. With inclinations of the central axes 12A$c$ and 12B$c$, it is possible to avoid the interference of the adjacent nozzles 12 and position the ejection areas within the entrance plane 15. Since the interference between the nozzles 12 can be avoided, the degree of freedom in design regarding the shape of the rotor blade 11 and the nozzle 12 can be improved.

What is claimed is:

1. A rocket-engine turbopump comprising:
a main shaft rotatably supported;
a pump section including an impeller attached to one end of the main shaft; and
a turbine section including:
a disk attached to the other end of the main shaft, rotor blades provided on an outer periphery of the disk, and
nozzles provided inclined to an entrance plane of a blade cascade constituted of the rotor blades, the nozzles having axisymmetric and circular cross sections and arranged in two rows along a circumferential direction of the main shaft in a plane orthogonal to the main shaft, wherein outlets of the nozzles in one of the two rows and outlets of the nozzles in the other of the two rows are alternately positioned around the main shaft so that a phase shift between ejection areas of the nozzles in the one of the two rows and ejection areas of the nozzles in the other of the two rows in the entrance plane is within a range of an angle from ¼ to ¾ of a circumferential angle defined by each ejection area with respect to a center of the main shaft.

2. The rocket-engine turbopump according to claim 1, wherein the nozzles are arranged so that projected areas of the outlets of the nozzles to the entrance plane along central axes of the nozzles are positioned within the entrance plane.

3. The rocket-engine turbopump according to claim 1, wherein
the outlets of the nozzles in one of the two rows and the outlets of the nozzles in the other of the two rows have mutually different cross-sectional areas.

4. The rocket-engine turbopump according to claim 2, wherein
the outlets of the nozzles in one of the two rows and the outlets of the nozzles in the other of the two rows have mutually different cross-sectional areas.

5. The rocket-engine turbopump according to claim 1, wherein a nozzle in one row of the two rows is referred to as a first nozzle, a nozzle in the other row of the two rows is referred to as a second nozzle, an ellipse of the outlet of the first nozzle projected on the entrance plane along a central axis of the first nozzle is referred to as the first ellipse, and an ellipse of the outlet of the second nozzle projected on the entrance plane along a central axis of the second nozzle is referred to as the second ellipse, and a major axis of the first ellipse and a major axis of the second ellipse are inclined in mutually opposite directions or in the same direction in the entrance plane.

6. The rocket-engine turbopump according to claim 2, wherein a nozzle in one row of the two rows is referred to as a first nozzle, a nozzle in the other row of the two rows is referred to as a second nozzle, an ellipse of the outlet of the first nozzle projected on the entrance plane along the central axis of the first nozzle is referred to as the first ellipse, and an ellipse of the outlet of the second nozzle projected on the entrance plane along the central axis of the second nozzle is referred to as the second ellipse, and a major axis of the first ellipse and a major axis of the second ellipse are inclined in mutually opposite directions or in the same direction in the entrance plane.

7. The rocket-engine turbopump according to claim 3, wherein a nozzle in one row of the two rows is referred to as a first nozzle, a nozzle in the other row of the two rows is referred to as a second nozzle, an ellipse of the outlet of the first nozzle projected on the entrance plane along a central axis of the first nozzle is referred to as the first ellipse, and an ellipse of the outlet of the second nozzle projected on the entrance plane along a central axis of the second nozzle is referred to as the second ellipse, and a major axis of the first ellipse and a major axis of the second ellipse are inclined in mutually opposite directions or in the same direction in the entrance plane.

8. The rocket-engine turbopump according to claim 4, wherein a nozzle in one row of the two rows is referred to as a first nozzle, a nozzle in the other row of the two rows is referred to as a second nozzle, an ellipse of the outlet of the first nozzle projected on the entrance plane along the central axis of the first nozzle is referred to as the first ellipse, and an ellipse of the outlet of the second nozzle projected on the entrance plane along the central axis of the second nozzle is referred to as the second ellipse, and a major axis of the first ellipse and a major axis of the second ellipse are inclined in mutually opposite directions or in the same direction in the entrance plane.

9. The rocket-engine turbopump according to claim 1, wherein
each of the nozzles is a De Laval nozzle.

10. The rocket-engine turbopump according to claim 2, wherein
each of the nozzles is a De Laval nozzle.

11. The rocket-engine turbopump according to claim 3, wherein
each of the nozzles is a De Laval nozzle.

12. The rocket-engine turbopump according to claim 4, wherein
each of the nozzles is a De Laval nozzle.

13. The rocket-engine turbopump according to claim 5, wherein
each of the nozzles is a De Laval nozzle.

14. The rocket-engine turbopump according to claim 6, wherein
each of the nozzles is a De Laval nozzle.

15. The rocket-engine turbopump according to claim 7, wherein
each of the nozzles is a De Laval nozzle.

16. The rocket-engine turbopump according to claim 8, wherein
each of the nozzles is a De Laval nozzle.

* * * * *